RE 26066

May 8, 1962          E. F. HUSTON          3,033,915
POTHEADS AND CABLE TERMINALS

Filed Feb. 23, 1960          2 Sheets-Sheet 1

INVENTOR.
ELMO F. HUSTON
BY
Kenneth W. Miller
ATTORNEY

May 8, 1962    E. F. HUSTON    3,033,915
POTHEADS AND CABLE TERMINALS
Filed Feb. 23, 1960    2 Sheets-Sheet 2

INVENTOR.
ELMO F. HUSTON
BY Kenneth W. Miller
ATTORNEY

United States Patent Office 3,033,915
Patented May 8, 1962

3,033,915
POTHEADS AND CABLE TERMINALS
Elmo F. Huston, 1186 Copley Road, Akron 20, Ohio
Filed Feb. 23, 1960, Ser. No. 10,363
11 Claims. (Cl. 174—73)

This invention relates to terminating devices for electric cables.

The principal object of the invention is to improve and simplify terminating arrangements for electric cables.

Another object of the invention is to improve and simplify grading arrangements in electric terminating devices.

In the art pertaining to high voltage power transmission, it is known to use oil or gas filled cables in which the cable incorporates a central conductor, a layer of solid insulating material, and an external oil or gas tight metallic sheath. In the employment of such cables, it is necessary to provide a terminating device, known as a pothead, for accomplishing the various terminating functions; specifically, connecting the cable conductor and sheath to the related power generation or utilization circuits; to maintain the necessary oil or gas pressure within the cable; and to control the electrical stresses in the insulating medium in the region at the end of the cable so that the medium does not puncture and short circuit the cable.

In accomplishing the last of the above-named functions, it is necessary to control the stress distribution in the longitudinal direction in the insulating medium between the end of the sheath and the end of the insulating medium adjacent the end of the central conductor. This is ordinarily accomplished by utilizing a plurality of grading capacitors which are arranged along the cable and are connected in series between the end of the sheath and the end of the conductor.

The present invention is directed to a cable terminating device in which the grading of stresses in the longitudinal direction in the terminating device is accomplished by means of grading foils disposed concentrically along and about the longitudinal axis of the cable at the terminal end thereof. The foils are arranged as cylindrically disposed inserts within a core which is constituted by a resin impregnated paper winding. The core itself forms a structural part of the pothead and has the terminal parts of the pothead supported from one end thereof. The remaining end of the core is provided with a base assembly which is secured to a joint at the end of the cable.

The grading foils are in two groups, one of which is constituted by concentrically and coaxially arranged foils for grading the longitudinal stress in the insulation at the end of the cable. These foils function as equipotential surfaces which are electrically in series and establish a uniform division of electrical stresses in the radial direction and, by reason of the varying lengths and disposition of the foils, to distribute the stresses in the longitudinal direction. The second group of foils are concentrically wound but have the extremities thereof but are connected together and have the ends thereof adjacent the first foils arranged in progressive relation to constitute an equi-potential surface for providing a smooth ground potential transition from the cable armor to the base of the device.

The invention together with further objects, features and advantages thereof will be understood with reference to the following detailed specification and claims and the appended drawings which show one embodiment of the invention. In the drawings:

Figure 1:
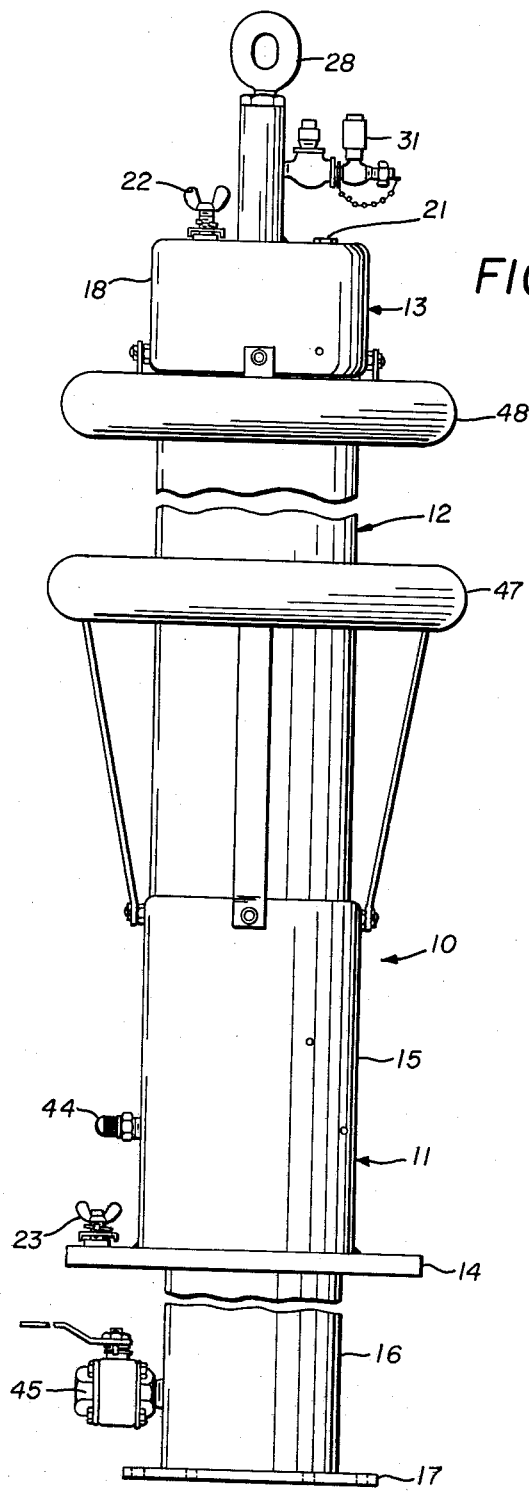
FIG. 1 is an exterior elevation view of the pothead of the invention showing certain control devices useful with the pothead.
Figure 2:
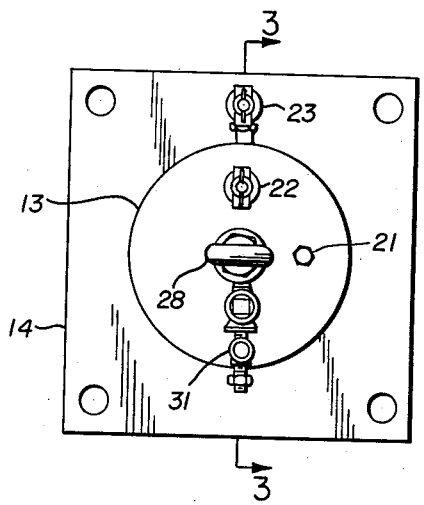
FIG. 2 is a top plan view of the bushing of FIG. 1.
Figure 3:
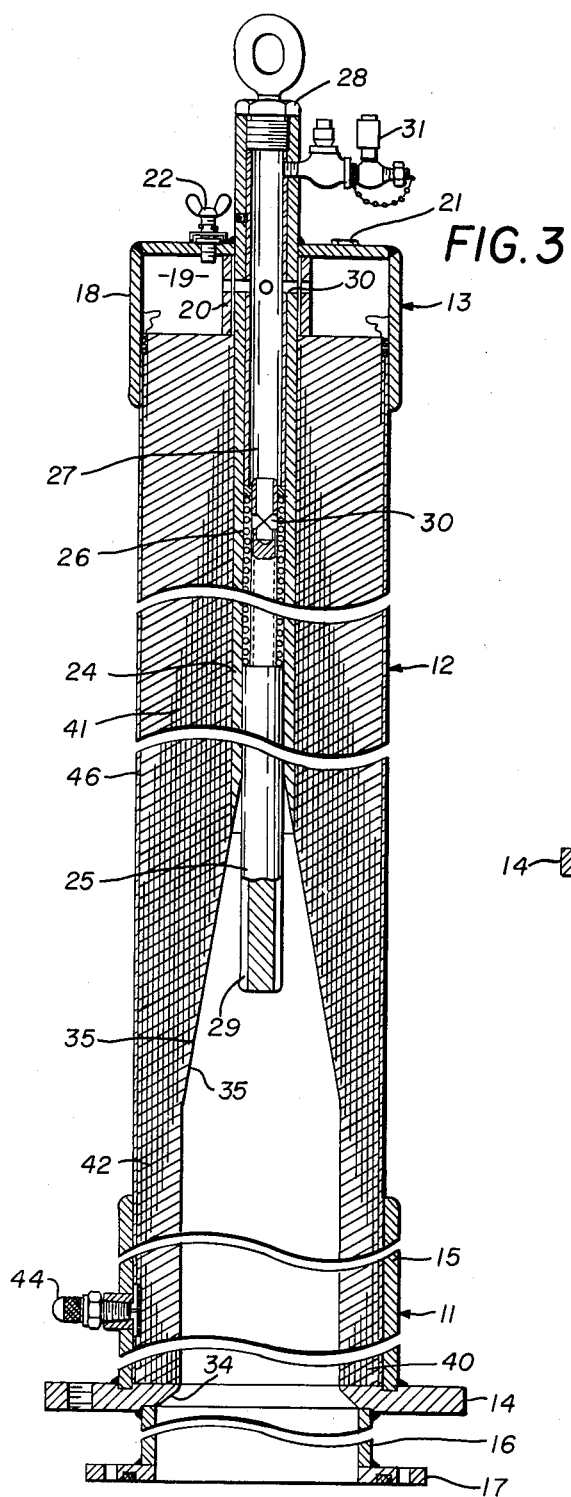
FIG. 3 is a vertical sectional view of the pothead of FIG. 1 taken in the direction 3—3 in FIG. 2.

Referring first to FIGS. 1 and 2 of the pothead of the invention comprises a manufactured assembly including a base 11, a core 12 and a cap 13. As shown particularly in FIG. 3, the core 12 comprises an elongate cylindrical body constituted by a cylindrical winding of resin impregnated paper which is cured to provide a rigid dense body which supports the cap 13 and is in turn supported by the base 11.

The base 11 comprises a base plate 14, a ground sleeve 15, a support sleeve 16, and a mounting flange 17. The sleeves 15 and 17 are received in the grooves in the base plate 14 and welded, brazed or otherwise attached to the plate to form fluid pressure-tight joints. The core 12 is secured in the sleeve 15 by means of a shrink-fit or a bond of resin, or adhesive, or both.

The cap 13 comprises a cylindrical metallic piece 18 which is fitted over the top end of and secured to the core 12. A top plate 14 is joined to the sleeve 18 and is spaced from the terminal end of the winding of the core to form an opening 19 which constitutes an oil reservoir. A spacer 20 insures assembly of the parts with a predetermined height at the top end of the pothead. A plug 21 is provided for filling the reservoir.

A screw fastener 22 on the top plate 14 functions as a line terminal and a screw fastener 23 mounted on the base plate serves as a ground terminal for the pothead.

The core 12 is wound upon a hollow cylindrical core tube 24 which extends along the interior of the core winding for a substantial distance and beyond the terminal end of the core through the spacer 19 and the cap plate 14. The core tube 24 is joined to the cap plate 14 to form a fluid pressure tight joint with the cap. A plunger 25 is received in the core 24 and contacts the end of the cable conductor to serve as a terminal connector for the pothead. The plunger 25 is maintained in spring-pressed relation to the end of the cable conductor by means of a spring 26 which extends between the plunger 25 and a spacer sleeve 27 which abuts a threaded plug 28 at the top end of the core tube 24. The plug 28 is formed with a ring which may conveniently serve as a lifting ring for the pothead. The plunger 25 is formed with grooves 29, which provide fluid communication between the interior of the cable and the interior of the core tube above the plunger.

The spacer 27 is formed with openings 30 to provide an oil passage between the cable and cable system and the reservoir at the top end of the pothead. A valve 31 which communicates with the interior of the guide tube 27 is provided for filling the interior of the pothead and/or cable and for relief of excessive pressures.

Figure 4:
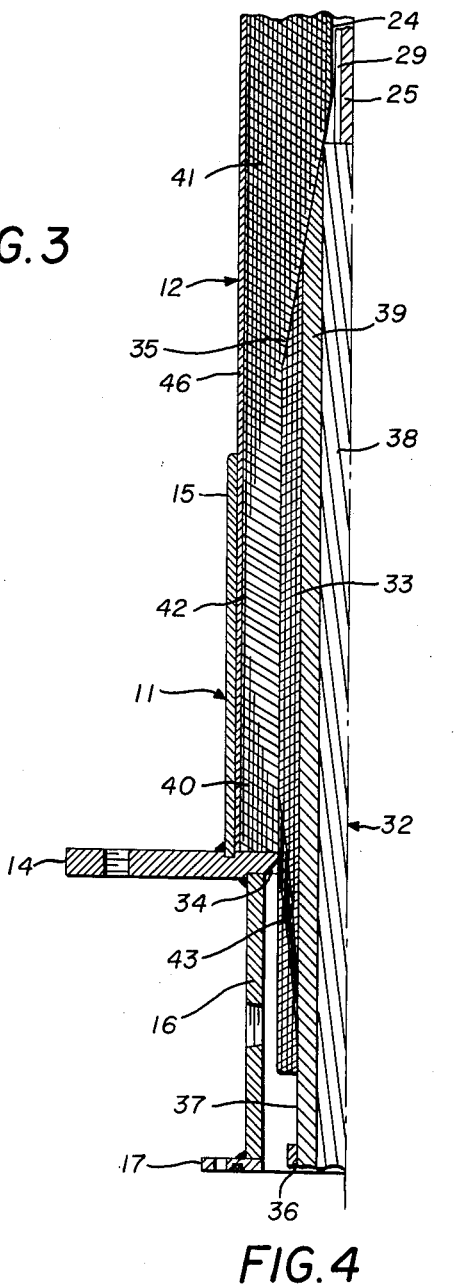
FIG. 4 is an enlarged view of a portion of the pothead showing particularly the relation of the core of the pothead to a cable and build-up in a cable terminal.

FIG. 4 shows a portion of the pothead 10 with the end part of a cable 32 and a buildup 33, and illustrates the arrangement of the parts in a completed installation. The cable 32 and the buildup 33 extend upward through the support 16, through an opening 34 in the base plate 14 and are shaped to conform to an opening 35 in the core. The cable 32 has the armor 36 terminated as shown, although not necessarily in this position, and the shield represented in outline at 37 extends from the shield to within the buildup 33. The conductor 38 of the cable 32 is engaged at its extremity by the plunger 25 and the insulation 39 of the cable is conformed to the opening 35 in the core.

The buildup 33 is a layer of insulation constituted by a paper or other sheet insulating material wound tightly about the exterior of the cable insulation 39 and may be formed in accordance with the teaching of U.S. Patent 3,005,868 to S. O. Linderholm. The buildup is supported at its lower end by means not shown herein.

The core 12 incorporates two groups of grading foils, designated at 40 and 41, for grading the radial and longitudinal stresses in the insulation 39 of the cable, in the buildup 35, and in the core 12. Both groups of foils are constituted by coaxial conducting layers which are formed by winding strips of foil between the successive turns of the paper of the core at predetermined intervals during the winding of the core. Thus the foils constitute cylindrical conducting surfaces which are disposed coaxially inside and outside the adjacent foils and coaxially about the conductor 38 and the core tube 27. The two groups of foils are related by an outside foil 42 which extends along the exterior of both groups of foils in capacitive relation thereto and is insulated from the ground sleeve 15.

The lower foils 40 have the outward extremities thereof in conductive contact with the base plate 17 so that all of the foils are maintained at the potential of the base plate 14 which is usually at ground potential. A continuous winding of foil 43 in the buildup 35 functions as an equi-potential surface and provides a ground potential transition from the shield 37 to the base 14. The foils 40 are of increasing length, proceeding radially outward from the opening 31 of the core, to adjacent the outside foil 42 so that the ground equi-potential surface is carried to the foil 42 which is connected to the ground sleeve 15 through the terminal 44. The foil arrangement which includes the foil 40, the foil 43 insures a uniform distribution of longitudinal stresses in the region of increasing insulation thickness in the region between the foils 40 and 41.

Because of the concentric arrangement of the foils 41, there is effected a radial grading of the potential between the conductor 38 and the core tube 27 and the foil 42 and the ground sleeve 15. That is, the total potential is divided in uniform steps in the radial direction and the stresses imposed upon the paper, or other dielectric material of the core 12 are relatively uniform in that direction. Additionally, however, the extremities of the foils 41 establish an equi-potential surface which insures a uniform distribution and termination of the longitudinal stresses in the region between the ground sleeve 15 and the core tube 27. The foils are arranged in a uniformly staggered relation which provides a smooth progression from the ground sleeve 15 to the core tube 27. The outer end of the foils 40 are also staggered to prevent undue concentrations in the paper and material of the core between the outer ends of those foils and the end of the core winding.

The core 12 is conveniently formed by winding a paper having a low content of low-loss electrical resin. Low resin content papers are preferred to assure maximum penetration of the insulating oil into the core while achieving maximum mechanical strength in the winding. After winding, the core is vacuum dried, cured, and then machined to form the opening 31. After assembly, the pothead may be evacuated and the core impregnated by closing the support sleeve 16 and introducing oil through the lower valve 45.

The core 12 is provided with a shell 46 of rigid composition insulating material although a ceramic housing can be provided between the cap tube 18 and the ground tube 15.

The outer foil is ordinarily maintained in grounded condition through the terminal 44 which may be utilized as a voltage tap for measurement or control functions. In this respect the armor of the cable, or the exterior conductor thereof where the two are separate, are connected to the base plate by means of an electrical connection indicated schematically in FIG. 4. Conventional means for providing a fluid-tight connection between the cable and the support sleeve 16 and the flange 17 are provided.

The pothead is fluid tight so that the fluid insulating medium is contained in a closed system, as is known in the art.

The pothead 10 is provided with exterior control rings 47 and 48 which are attached to the ground sleeve 15 and the cap 13, respectively for control of external stresses and to prevent flashover.

It is to be understood that the foregoing description is not intended to restrict the scope of the invention and that various rearrangements of the parts and modifications of the design may be resorted to.

I claim:
1. A cable terminating device comprising a rigid core constituted by a metal core tube and a surrounding body of sheet insulating material with an adherent impregnant of low loss insulating material for reinforcing the sheet material, an opening in the core extending from one end thereof inwardly into the body and the core tube extending from the opening to the remaining end of the core and projecting beyond the end of the sheet material, a base at the said one end of the core constituted by a base plate, a ground sleeve attached to the base plate and extending along the exterior of the core with the core received in the ground sleeve for supporting the core from the base, a cap at the said remaining end of the core comprising a tubular piece extending along the exterior of the core and a cap plate spaced from the outer end of the core to constitute a closed reservoir and a fluid tight joint between the core and the cap, spring pressed terminal means carried in the core tube, and means for grading electrical stresses in the insulating material comprising a plurality of cylindric foils arranged in concentric radially spaced relation to each other and to the core tube and the inner extremities of the foils being successively displaced from the core tube toward the ground sleeve for uniformly distributing radial and longitudinal stresses in the said insulating material.

2. The invention in accordance with claim 1 in which stress distributing foils are provided at the said one end of the core adjacent the base plate comprising interconnected foils having the inner ends thereof extending progressively greater distances from the base plate in proceeding radially outward from the opening in the core to the ground sleeve for providing a ground potential transition from the base plate to the ground sleeve.

3. The invention in accordance with claim 2 in which the stress distributing foils referred to therein are arranged as a continuous winding of foil.

4. The invention in accordance with claim 1 in which the said foils have the ends thereof extending successively closer to the cap piece in proceeding radially inward from that portion of the core longitudinally adjacent the inner end of the core tube and toward the cap for grading radial stresses in the sheet material exteriorly of the core tube.

5. The invention in accordance with claim 1 in which a cylindric piece of rigid insulating material surrounds the winding of sheet insulating material of the core and extends between the base and the cap.

6. The invention in accordance with claim 1 in which the core tube extends through the cap plate and with a fluid tight joint there between opening through the wall of the core tube within the cap providing fluid communication from the reservoir through the core tube.

7. A cable terminating device comprising a core constituted by a core tube and a rigid body of insulating material on the core tube, a base at one end of the core constituted by a transversely arranged base plate supporting the core, the said base constituting means for supporting the said device in mechanically fixed and electrically connected relation to a cable, with the cable conductor and cable insulation received within an opening extending into the core from the said one end thereof, and with the armor connected to the base to constitute a ground connection therefore, a cap at the remaining end of the core comprising a tubular piece extending along the exterior of the core, and an end part spaced from the end of the said sheet material for retaining a fluid insulating medium within the core and the core tube, terminal means carried by the said cap, and terminal means carried by the said core tube for engagement with the cable conductor, and an electro-conductive connection between the two said terminal means.

8. A cable terminating device comprising a core constituted by a core tube and a rigid body of insulating material on the core tube, a base at one end of the core constituted by a transversely arranged base plate, means securing the core to the base plate, the base constituting means for supporting the said device in mechanically fixed and electrically connected relation to a cable, with the cable conductor and cable insulation received within an opening extending into the core from the said one end thereof, and with the armor connected to the base to constitute a ground connection therefore, a cap at the remaining end of the core supported by the said core and having a cylindric part thereof extending along and secured to the exterior of the core, and an end part spaced from the end of the said sheet material for retaining a fluid insulating medium within the core and the core tube, terminal means carried by the said cap, and terminal means carried by the said core tube for engagement with the cable conductor, and an electro-conductive connection between the two said terminal means, and metallic foils imbedded within the said insulating material and arranged in concentrically spaced and longitudinally staggered capacitive relation with each other and the core tube and with the outermost of the said foils grounded to the base plate for radial and longitudinal grading of stresses in the said sheet material.

9. The combination with a power cable constituted by an interior conductor, a surrounding layer of insulation and an external conductor of a cable terminating device comprising a core constituted by a core tube and, a rigid cylindric winding of sheet insulating material on the core tube, a base at one end of the core constituted by a transversely arranged base plate supporting the core, the base comprising means supporting the said device in mechanically fixed and electrically connected relation to the cable with the cable conductor and cable insulation received through an opening in the base plate and received within an opening extending into the core from the said one end thereof, and electrically conductive and fluid-tight connections between the base and the external conductor of the cable, a build-up of sheet insulating material between the cable insulation and the core, a terminal cap at the remaining end of the core comprising a tubular piece extending along the exterior of the core in fluid-tight relation thereto, and an end part spaced from the sheet material of the said core to constitute a reservoir, terminal means carried by the said cap and terminal means held by the core tube with spring means for maintaining the said second terminal means in electro-conductive engagement with the conductor of the cable and with an electro-conductive connection between the said two terminal means.

10. The combination with a power cable constituted by an interior conductor, a surrounding layer of insulation and an external conductor of a cable terminating device comprising a core constituted by a core tube and a rigid cylindric winding of sheet insulating material on the core tube, a base at one end of the core constituted by a transversely arranged base plate, means securing the core to the base plate, the base comprising means supporting the said device in mechanically fixed and electrically connected to the cable with the cable conductor and cable insulation received through an opening in the base plate and received within an opening extending into the core from the said one end thereof, and electrically conductive and fluid-tight connections between the base plate and the external conductor of the cable, a buildup of sheet insulating material between the cable insulation and the core, a terminal cap at the remaining end of the core having a cylindric part thereof extending along in fluid-tight relation thereto, and an end part spaced from the sheet material of the said core to constitute a reservoir, terminal means carried by the said cap and terminal means held by the core tube with spring means for maintaining the said second terminal means in electro-conductive engagement with the conductor of the cable and with an electro-conductive connection between the said two terminal means, and metallic foils imbedded within the said winding of sheet material and arranged in concentrically spaced and longitudinally staggered capacitive relation with each other and the core tube and with the outermost of the said foils grounded to the base plate for grading radial and longitudinal stresses in the said sheet material.

11. The combination with a power cable constituted by an interior conductor, a surrounding layer of insulation and an external conductor of a cable terminating device comprising a core constituted by a core tube and a rigid cylindric winding of sheet insulating material on the core tube, a base at one end of the core constituted by a transversely arranged base plate supporting the core, the base comprising means supporting the said device in mechanically fixed and electrically connected to the cable with the cable conductor and cable insulation received through an opening in the base plate and received within an opening extending into the core from the said one end thereof, and electrically conductive and fluid-tight connections between the base and the external conductor of the cable, a buildup of sheet insulating material between the cable insulation and the core, a terminal cap at the remaining end of the core supported by the core and having a cylindric part thereof extending along and secured to the core in fluid-tight relation thereto, and an end part spaced from the sheet material of the said core to constitute a reservoir, terminal means carried by the said cap and terminal means held by the core tube with spring means for maintaining the said second terminal means in electro-conductive engagement with the conductor of the cable and with an electro-conductive connection between the said two terminal means, and metallic foils imbedded within the said winding of sheet material in two groups in which the first group is arranged in concentrically spaced and longitudinally staggered relation inwardly and from adjacent the base plate to the core tube with the outermost of the said foils grounded to the base plate for grading radial and longitudinal stresses, and a second group arranged in longitudinally staggered relation from the outermost foil to the base plate and connected to the base plate for radial control of longitudinal stresses.

References Cited in the file of this patent

UNITED STATES PATENTS

| 1,967,653 | Austin | July 24, 1934 |
| 2,650,334 | Skeats | Aug. 25, 1953 |
| 2,651,670 | Bosworth | Sept. 8, 1953 |

FOREIGN PATENTS

| 270,420 | Great Britain | May 9, 1927 |